June 3, 1930.  W. F. GRUPE  1,762,138
COMPOSITE CORK BODY, SHEET, BLOCK, ETC., AND METHOD OF PRODUCING SAME
Filed Oct. 1, 1927
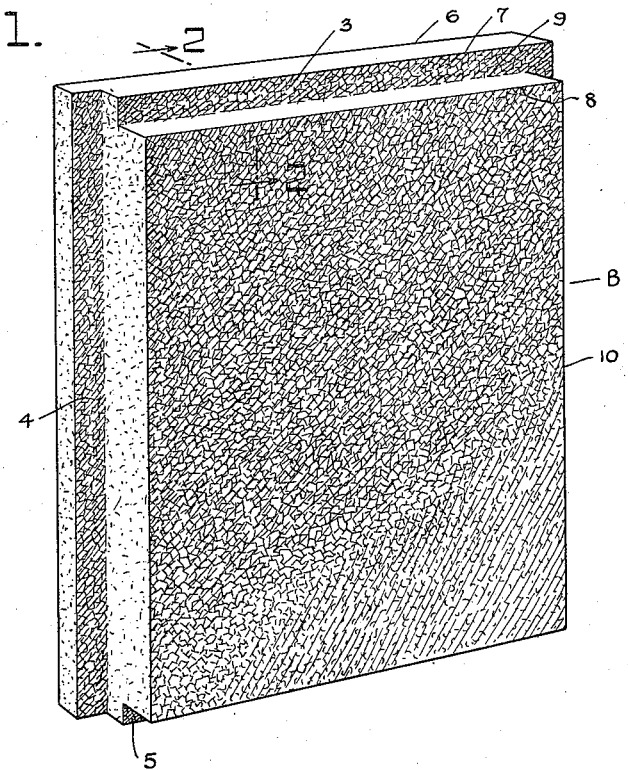
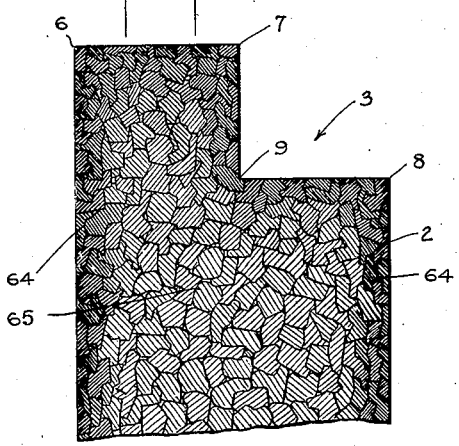
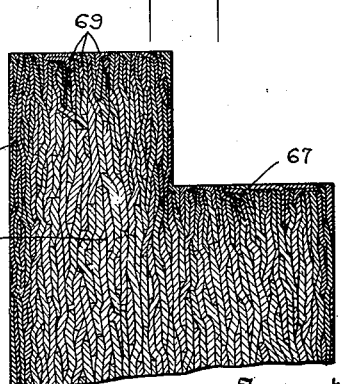
Inventor,
William F. Grupe,
By his Attorney,
Henry J. Lucke.

Patented June 3, 1930

1,762,138

UNITED STATES PATENT OFFICE

WILLIAM F. GRUPE, OF RUTHERFORD, NEW JERSEY, ASSIGNOR TO ARMSTRONG CORK COMPANY, OF LANCASTER, PENNSYLVANIA, A CORPORATION OF PENNSYLVANIA

COMPOSITE CORK BODY, SHEET, BLOCK, ETC., AND METHOD OF PRODUCING SAME

Application filed October 1, 1927. Serial No. 223,300.

My invention relates to composite cork bodies—sheets, blocks, etc.—having improved characteristics, and to methods of producing the same.

A principal object is to provide a body, consisting of relatively small pieces or particles of cork in any of various forms, with a suitable binder which is usually the natural gum or resin exuded by the cork in the process of production, and in which the surface layers are relatively compressed, hard and dense, and composed of tightly interlocked particles, while the interior portion is relatively soft, elastic and expanded. The complete block or body is therefore of light weight in proportion to its cubic volume. The dense, hard non-porous surface layer is highly resistant to breaking or crushing under impact, protects the relatively soft or expanded interior of the block against mechanical strains and access of moisture and renders the entire block or body very strong and resistant to tensile, bending or crushing strains. This surface or exterior layer also provides a suitable base for paint or practically any other desired surface finish without previous application of a heavy filler such as asphalt. The surface also adheres readily to various applied materials such as cement, plaster, etc. when used in building structures, or as sheathing, and also has the mechanical strength necessary to receive and retain metallic fastening devices such as nails or screws for the attachment of the blocks to supports, or for the connection to the blocks of straps or other elements of metal or wood. The hard surface also resists strains or damage caused by rough handling in packing or shipment. When sharp corners are formed in the body, the dense surface layer comprising these corners is of such strength that crumbling is avoided, and chipping is well resisted, even when the blocks are roughly handled.

Such blocks or bodies are useful for many purposes, such as for sheathing refrigerators, ice boxes, ice houses, and in various other building structures, and when so used have high heat insulating qualities, efficiently resisting absorption of heat from without or dissipation of heat from within the structure. They are also highly fire-resistant, since cork itself does not readily burn but will only slowly char even when subjected to direct flame, and the dense surface layer has greatly increased resistance to charring and therefore efficiently protects the softer interior mass from high temperature or flame. The material is also useful for jacketing pipes, boilers, etc., and in practically any other applications where high heat insulating or fire resisting qualities are desirable and especially when high mechanical strength is also desired.

Composite cork bodies have heretofore been of practically homogeneous or uniform character; that is, of uniform texture and density throughout and without any compact, highly compressed, hard or smooth surface or surface layer; therefore they lack the various advantages characteristics or qualities above referred to, and especially do not present a smooth or suitable surface for painting or adherence to other substances such as cement, plaster etc.; are relatively heavy in proportion to cubic volume, are not such effective heat insulators, do not have a hard surface which protects the interior structure, have not the desired strength or resistance to tensile, bending or crushing strains, do not afford proper means for receiving and retaining metal fastening devices, etc., as will be sufficiently understood from the preceding explanation of the advantageous characteristics of the present product.

In the formation of these bodies I employ molds having movable members admitting of a suitable degree of initial compression of the cork, and these molds are slightly pervious at the joints, permitting escape of gases. The finely divided or comminuted cork in any of various forms is charged into the molds, and the molds are closed or clamped to apply substantial pressure to the particles, all of which are therefore substantially compressed and because of their naturally resilient cellular structure are ready to exert powerful expansive force whenever resisting pressure in any direction is relaxed. The molds are then passed into and through a suitable furnace in which a relatively high degree of heat is applied to the molds in the early stage of the heat treatment. This high temperature suddenly applied quickly penetrates the mold walls, and the outer layers of the highly compressed cork particles are quickly heated to a high degree before the high temperature penetrates to the interior of the mass. The heating of the outer layers rapidly vaporizes the contained moisture, liquefies and drives out of the cellular structure the natural resins therein and distills out the more volatile portions of the resins, with a resulting softening of the structure of the outer cork particles, which are thereupon very substantially compressed into close and substantially interlocked engagement, by the resilient expansive action of the interior mass. As the molds progress through the furnace the temperature is reduced at a suitable rate, and as the heat penetrates to the interior portions of the cork mass, they are subjected to an effect similar to that previously produced upon the outer portions; namely, the contained moisture is evaporated, the natural resins are driven out of the cellular structure and the more volatile components are vaporized, and these gases passing outward exert a further powerful compression effect upon the already initially compressed outer layers, and finally these gases escape through the pervious portions or interstices of the mold. In the heating of the interior body as just described its cork particles are expanded and made relatively soft or gelatinous, while the resins freed from the interior cellular structure of the cork fragments are now in condition to act as a natural binder when the body is cooled; and in case the natural resins are of insufficient quantity to serve as a binder for the particular purpose in view, additional resin or rosin or other suitable binders may be added to the comminuted cork before it is placed in the mold. The molds are cooled, the binder solidifies and the completed articles are removed from the mold.

In the latter part of the heat treatment the outer layers are baked and solidified to a controllable degree by variations of the heat treatment. As above stated, the heat treatment may be varied considerably, with regard to the nature of the material and the purposes in view. As one representative example, the temperature in the forward part of the furnace, for the rapid initial high heating above referred to, may be from say 600 to 800 degrees F., the higher temperature being preferred in some cases; and this high temperature treatment may continue for a controllable time, say one-half hour in some cases; and thereafter the temperature is gradually dropped to the range of, say, 500 to 550 degrees F. in the rearward portions of the furnace, the temperature effect upon the cork material being of course also dependent upon the rate of travel of the molds. This rate may be such that in one example the molds require three hours for the total travel through the furnace, of which approximately one-half hour may be in the high temperature zone. As just above stated the various temperatures and times of treatment may be varied within wide limits.

As will be readily noted from preceding explanation, the process is well adapted to the production of different shapes and sizes of blocks or other bodies which may have fairly intricate or irregular outlines, including square or sharp corners, and on account of the hard and dense surface formation, these blocks will practically rigidly retain their shape; the corners or other surfaces will remain in undistorted condition. The corners especially are sharply defined, clean-cut and free from crumbling or chipping, and the blocks will readily and accurately fit together to form structures of a predetermined shape.

The accompanying drawing shows certain representative embodiments of the product. After considering these examples, and the following and preceding explanations of the process included in the invention, skilled persons will understand that many variations may be made without departing from the invention, and I contemplate the employment of any structures, or any performances of the process, which are properly within the scope of the appended claims.

Fig. 1 is a perspective view of a cork body or block embodying the invention in one form.

Fig. 2 is a section at 2—2, Fig. 1.

Fig. 3 is a similar section of a modified product.

B is a composite cork block or body which may be of almost any form or shape. The present form sufficiently indicates the possibilities of producing the bodies in various more or less complicated forms as well as relatively plain, rectangular shapes, and in practically any sizes. The particular example given is a block or board of heavy cross section intended for use as a sheathing or part of the wall of a refrigerator or similar structure. The body includes main parallel sides or faces 1 and 2 and narrower edges, including the various channels or rabbets such as 3, 4, 5 and various right-angled or sharp corners such as 6, 7, 8 etc.

In the example of Figs. 1 and 2 the body consists of cork particles or granules of ordinary, substantially spherical form, as generally produced for the manufacture of composite cork board. These are held together by a binder which preferably consists of the natural gums or resins exuded from the cork in process of manufacture, or in some cases other suitable binding material may be added. By reason of the production process as above sufficiently described, in the finished product the surface layer 64 as indicated by the relatively compressed shape of the cork particles and by the relatively close sectionlining, is relatively very hard, compact, nonporous and dense with a smooth, hard and uniform exterior surface, and with its particles tightly interlocked by their various complemental irregularities, especially at the corners, while the interior portion 65 is relatively soft and expanded, so that all previously existing voids or spaces are materially reduced in number, and the cork structure is solid and substantially continuous throughout. The particles are secured together by the natural or other binder, which it is not practicable to definitely indicate in the drawing. The corners are sharp and well defined, and highly resistant to crumbling and chipping, and the article has the other advantageous characteristics or qualities referred to above.

Fig. 3 shows a slightly different form of the product, in which the cork fragments 69 are in the form of "plates" of the character disclosed in my pending application, Serial No. 202,564, filed June 30, 1927. These plates are arranged in substantially parallel, flat, overlapping relation, and are placed in the mold, pressed and heat-treated in the manner previously described, resulting in the relatively compressed, hard and dense surface layer 67 and the relatively soft and expanded central portion 68, substantially as in the previous example. The invention is therefore not limited as to its broader characteristics, with respect to the nature or form of the cork fragments or particles or as to the character of the binder, although as above stated, self-bound cork is preferred for many purposes.

As stated early above, this composite cork body is of light weight in proportion to cubic volume. In a particular example the blocks or bodies will weigh as little as .7 lbs. per board measure foot, that is, a piece one foot square and one inch thick; whereas ordinary composite cork bodies weigh approximately .8 to .9 lbs. for the same measure, representing a substantial saving of material. The surface density of my cork bodies is also substantially equal to that of ordinary corkboard weighing from 1. to 1.2 lbs. per board measure foot. In some cases the present product may weigh as much as .75 lbs. per board measure foot, with corresponding increase in structural strength but even this percentage difference from ordinary "board" represents a very substantial and economic saving of material.

I claim:

1. A composite cork body consisting of cork fragments and a binder, a surface layer of the body being wholly substantially compressed and the interior portion being wholly relatively expanded.

2. A composite cork body consisting of cork fragments of moderate size and a binder, the adjacent surface layers of the body being wholly substantially compressed and dense and the interior portion being wholly relatively uncompressed and soft.

3. A composite cork body consisting of cork fragments and a binder, the fragments constituting the adjacent surface layers of the body being wholly substantially compressed, dense and hard, and the fragments constituting substantially the whole of the interior portion of the body being relatively expanded and soft.

4. A composite cork body comprising comminuted cork and a binder, the whole of the surface layers of the body being relatively compressed, hard, smooth, continuous and impervious, and interior portions of the body being wholly relatively expanded and soft.

5. A composite cork body of reduced total weight in proportion to volume, comprising fragmentary cork and a binder, a surface layer of the body being substantially compressed and dense and an interior portion being relatively uncompressed and soft, said cork body having the unit weight of approximately seven-tenths of a pound per board measure foot.

6. A composite cork body composed of comminuted cork and a natural binder, the whole of the surface layers of the body being substantially compressed to form a relatively hard, dense, strong and impervious surface layer, and the whole of the interior portion being relatively expanded, light and uncompressed and forming a relatively light interior structure, said cork body having the unit weight of approximately seven-tenths of a pound per board measure foot.

7. A composite cork body composed of comminuted cork and a natural binder, the whole of the outer surfaces of the body being substantially compressed to form a relatively hard, dense, strong and impervious surface layer, and substantially the whole of the interior portion being relatively expanded, light and uncompressed and forming a relatively light interior structure, the exterior surfaces being also smooth, solid and impervious, affording a substantially non-porous base for paint or other surface finish.

8. A composite cork body comprising cork fragments of moderate size and a binder, the whole of the surface layers of the body being relatively dense and hard and the whole of the interior portion being relatively light, the unit weight of the body being approximately seven-tenths of a pound per board measure foot.

9. A process of producing cork bodies having characteristics described, comprising placing cork fragments under initial pressure in a mold, and subjecting the mold and the cork therein to high temperature of approximately from six hundred to eight hundred degrees Fahrenheit and maintaining such temperature for sufficient time to soften the external layers of the cork mass which are thereby tightly compacted by expansive pressure of interior portions of the mass, and continuing the heat treatment of the cork mass within the mold for a relatively long period at the temperature range of from five hundred to five hundred and fifty degrees Fahrenheit.

10. A process of producing cork bodies having characteristics described, comprising placing cork fragments under initial pressure in a mold, and subjecting the mold and the cork therein to high temperature and maintaining such temperature for sufficient time to soften the external layers of the cork mass which are thereby tightly compacted by expansive pressure of interior portions of the mass, and thereafter continuing the heat treatment at reduced pressure for sufficient time to vaporize the contained volatiles of the interior body, which exert further compacting pressure upon the external layers.

11. A process of producing cork bodies having characteristics described, comprising placing cork fragments under initial pressure in a mold, and subjecting the mold and the cork therein to high temperature and maintaining such temperature for sufficient time to soften the external layers of the cork mass which are thereby tightly compacted by expansive pressure of interior portions of the mass, and thereafter continuing the heat treatment at reduced pressure for sufficient time to vaporize the contained volatiles of the interior body, which exert further compacting pressure upon the external layers, leaving the interior of the mass in relatively expanded and light condition.

12. A process of producing cork bodies of characteristics described, comprising charging natural cork fragments into a contractible mold having interstices which permit escape of gases, contracting the mold to place the cork mass under substantial initial compression, subjecting the mold to heat treatment for a regulated time including the application of relatively high temperature of approximately from six hundred to eight hundred degrees Fahrenheit in the initial stage sufficient to vaporize moisture contained in the outer layers of the cork mass, liquefy and drive out the natural resins in such portions and gasify volatilizable components of the resin, with resulting softening of such external layers which are thereupon compressed by resilient expansion of the interior mass, and continuing the heat treatment of the cork mass within the mold for a relatively long period at the temperature range of from five hundred to five hundred and fifty degrees Fahrenheit.

13. A process of producing cork bodies of characteristics described, comprising charging natural cork fragments into a contractible mold having interstices which permit escape of gases, contracting the mold to place the cork mass under substantial initial compression, subjecting the mold to heat treatment for a regulated time including the application of relatively high temperature in the initial stage sufficient to vaporize moisture contained in the outer layers of the cork mass, liquefy and drive out the natural resins in such portions and gasify volatilizable components of the resin, with resulting softening of such external layers which are thereupon compressed by resilient expansion of the interior mass, and continuing with heat treatment at reduced temperature for a time sufficient to similarly affect the interior portions of the mass whereby the produced gases additionally compress the external layers and said interior portions of the mass are expanded and rendered relatively light.

14. A process of producing cork bodies of characteristics described, comprising charging natural cork fragments into a contractible mold having interstices which permit escape of gases, contracting the mold to place the cork mass under substantial initial compression, subjecting the mold to heat treatment for a regulated time including the application of relatively high temperature in the initial stage sufficient to vaporize moisture contained in the outer layers of the cork mass, liquefy and drive out the natural resins in such portions and gasify volatilizable components of the resin, with resulting softening of such external layers which are thereupon compressed by resilient expansion of the interior mass, and continuing with heat treatment at reduced temperature for a time sufficient to similarly affect the interior portions of the mass whereby the produced gases additionally compress the external layers and said interior portions of the mass are expanded and rendered relatively light, the final part of the heat treatment serving to substantially set the respective portions of the body in stated conditions, and then cooling the molded body, whereupon its physical characteristics are made permanent.

15. A process of producing composite cork bodies, comprising the stage of subjecting comminuted cork confined in a mold to sudden and relatively brief application of high temperature followed by a longer period at lower temperature with subsequent cooling thus producing a compacted outer layer of the mass with a relatively soft interior.

In testimony whereof I have signed this specification this 26th day of Sept., 1927.

WILLIAM F. GRUPE.